May 15, 1956  R. H. JOHNSON ET AL  2,745,250

REVERSE VORTEX COMBUSTION CHAMBER

Filed Sept. 26, 1952

Inventors:
Robert H. Johnson,
Raymond H. Shackelford,
by Richard E. Hosley
Their Attorney.

United States Patent Office 2,745,250
Patented May 15, 1956

2,745,250

REVERSE VORTEX COMBUSTION CHAMBER

Robert H. Johnson and Raymond H. Shackelford, Schenectady, N. Y., assignors to General Electric Company, a corporation of New York Application September 26, 1952, Serial No. 311,754

5 Claims. (Cl. 60—39.65)

This invention relates to combustion chambers and specifically to those utilizable in gas turbine power plants for the jet propulsion of aircraft and domestic and commercial oil and gas burners.

Combustion chambers capable of releasing large amounts of high energy fluid per unit volume are desirable in the aircraft jet propulsion field and for small compact domestic fuel burners. The high velocities and temperatures of combustion raise the problems of completeness of reaction within the combustion chamber and cooling of chamber wall surfaces, the latter to some extent may be overcome at least partially by air cooling. In those cases where the combustion reaction is incomplete, deposits of carbon may occur on relatively cool wall surfaces, and ultimately result in undesirable hot spots because of poor heat transfer; and smoking of the unburned gases may take place.

It is an object of this invention to provide for more efficient and stable combustion in aircraft gas turbine power plants with a minimum of pressure drop.

It is another object of invention to provide a combustion chamber with an improved structure for obtaining a more efficient burning process.

A further object of invention is to provide an improved combustion chamber structure for substantially complete combustion without undue heating of the chamber walls.

Figure 1:
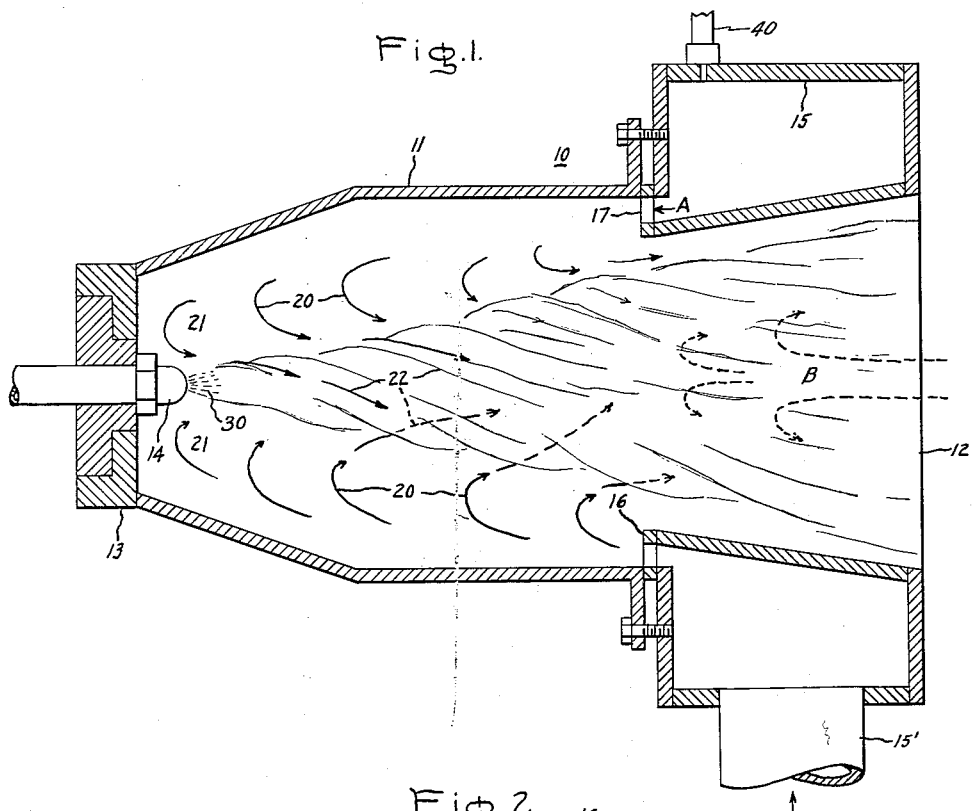
Figure 2:
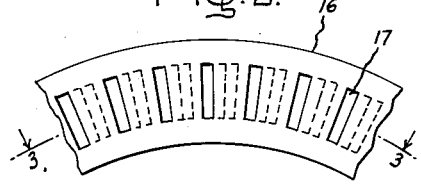
Figure 3:
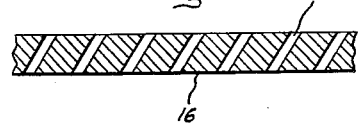

Various other objects, features and advantages of the invention will be apparent from the following description, and from an inspection of the accompanying drawing, in which Fig. 1 is a longitudinal cross sectional view of a combustion unit embodying the present invention;

Fig. 2 is a partial view of the air inlet structure looking in the direction A of Fig. 1, and Fig. 3 is a partial development of a section taken above line 3—3 of Fig. 2.

In carrying out my invention in one form, the air added to the combustion zone is used in part to complete combustion while the rest is used to cool the wall surfaces of the combustion chamber as well as the products of combustion to the desired temperature.

Referring to the figures in the drawing, the combustion chamber, which can be used in gas turbine construction or where large quantities of heated air are required to be obtained from the burning of fuel, is indicated generally at 10, comprising a flame tube 11, usually cylindrical, having an open end 12 and a closed end 13 with a fuel injector 14 extending through the center thereof.

About only the open end 12, there is located an annular nozzle box 15, supplied at 15' from a source of pressurized air and having along one side, a nozzle plate 16 with a circular row of nozzle openings or slots 17 extending at an angle in order to direct the air into the flame tube of the combustion chamber in a swirling fashion. These nozzle openings or slots, which are contiguous the inner periphery of the tube as shown in the drawing, may be either punched out or drilled angularly in order to obtain vortical admission of the air.

My improved burner works on what may be called the reverse vortex principle and it has been found that the necessity for a liner in the combustion chamber is eliminated.

Air is forced upstream toward the closed end of the chamber through the angularly directed openings 17 in the annular nozzle plate 16 so that the resulting pressure drop causes a high velocity vortex flow into the combustion chamber as indicated by the arrows 20. Fuel 30 is sprayed into the chamber at the closed end thereof where it is entrained by the swirling air adjacent its reversal area 21 so that the resulting fuel-air mixture starts to flow back out through the center of the combustion chamber in the form of a vortex indicated by arrows 22, within the incoming air vortex and in the reverse direction thereof. This vortical air flow and reverse vortex flow of the fuel-air mixture leads to good combustion.

The air that mixes with the fuel first has received the maximum amount of preheat and it is in the zone of mixing adjacent the reversal area 21 that ignition is started by conventional means, none being shown here. Air is being constantly added throughout the entire length of the combustion zone, the outer portion of the air vortex cooling the wall surface of the flame tube and so dispensing with the need of a combustion chamber liner, while the inner portion of the air vortex provides air for completion of the combustion process, the lower pressure existing in the central area of the fuel-air burning mixture not only being conducive to this action but also drawing in other air, as indicated by the arrows at B.

The fuel injection system need not be as critical as is necessary in most combustion systems because the reversal of the air vortex assists in atomizing the injected fuel and its mixing with the air. A pressure tap for experimental use is indicated at 40.

It will be evident that my invention provides a simple and economical combustion chamber which can be readily serviced when repairs are required. Although many changes can be made in the disclosed apparatus without departing from the scope of the claims, it is intended that this disclosure be interpreted as illustrative and not limitative.

What I claim as new and desire to secure by Letters Patent of the United States is:

1. A flame tube comprising an imperforate casing with open end and a closed end, fuel inlet means located at said closed end, and air inlet means for admission of combustion and cooling air located only adjacent said open end and facing said fuel inlet means, said air inlet means comprising a plurality of angular openings contiguous the inner periphery of said tube, said openings imparting a vortical motion to admitted air whereby cooling of said wall is obtained by the flow of said air thereagainst, said air reversing its direction of flow upon impact with said closed end, said fuel being admitted into the area of reversal of flow whereby an intimate fuel-air mixture is obtained.

2. A combustion chamber comprising a substantially annular, imperforate casing with open end and a closed end, fuel inlet means adjacent said closed end, and air inlet means for vortical admission of combustion and cooling air located only adjacent said open end and facing said fuel inlet means, said air inlet means comprising a nozzle plate provided with angular nozzle openings contiguous the inner periphery of said casing, whereby a rotating envelope of said air is provided.

3. A combustion chamber comprising a substantially annular, imperforate casing with an open end and a closed end, fuel admission means adjacent said closed end, an annular nozzle plate with a plurality of angular nozzle openings for vortical admission of combustion and cooling air located only adjacent said open end and facing said fuel admission means, said nozzle plate contiguous the inner periphery of said casing, and an annular nozzle box positioned around said casing adjacent the open end thereof and adapted to communicate with said nozzle openings.

4. A combustion chamber comprising an imperforate casing with an open end and a closed end, fuel inlet means adjacent said closed end, and air inlet means located only adjacent said open end and facing said fuel inlet means, said air inlet means comprising a plurality of angularly directed nozzle openings for vortical admission of combustion and cooling air.

5. A combustion chamber comprising a substantially annular, imperforate casing with an open end and a closed end, fuel inlet means adjacent said closed end, and air inlet means located only adjacent said open end and facing said fuel inlet means, said air inlet means comprising a plurality of angularly directed nozzle openings contiguous the inner periphery of said casing for vortical admission of combustion and cooling air.

References Cited in the file of this patent

UNITED STATES PATENTS

| | | |
|---|---|---|
| 1,580,656 | De Coninck | Apr. 13, 1926 |
| 1,852,968 | Hillhouse | Apr. 5, 1932 |
| 2,458,992 | Hague | Jan. 11, 1949 |
| 2,603,064 | Williams | July 15, 1952 |
| 2,618,928 | Nathan | Nov. 25, 1952 |
| 2,625,791 | Yellott | Jan. 20, 1953 |
| 2,659,201 | Krejci | Nov. 17, 1953 |